Aug. 13, 1929.　　　C. C. ARMSTRONG　　　1,724,164
ELECTRIC STOVE

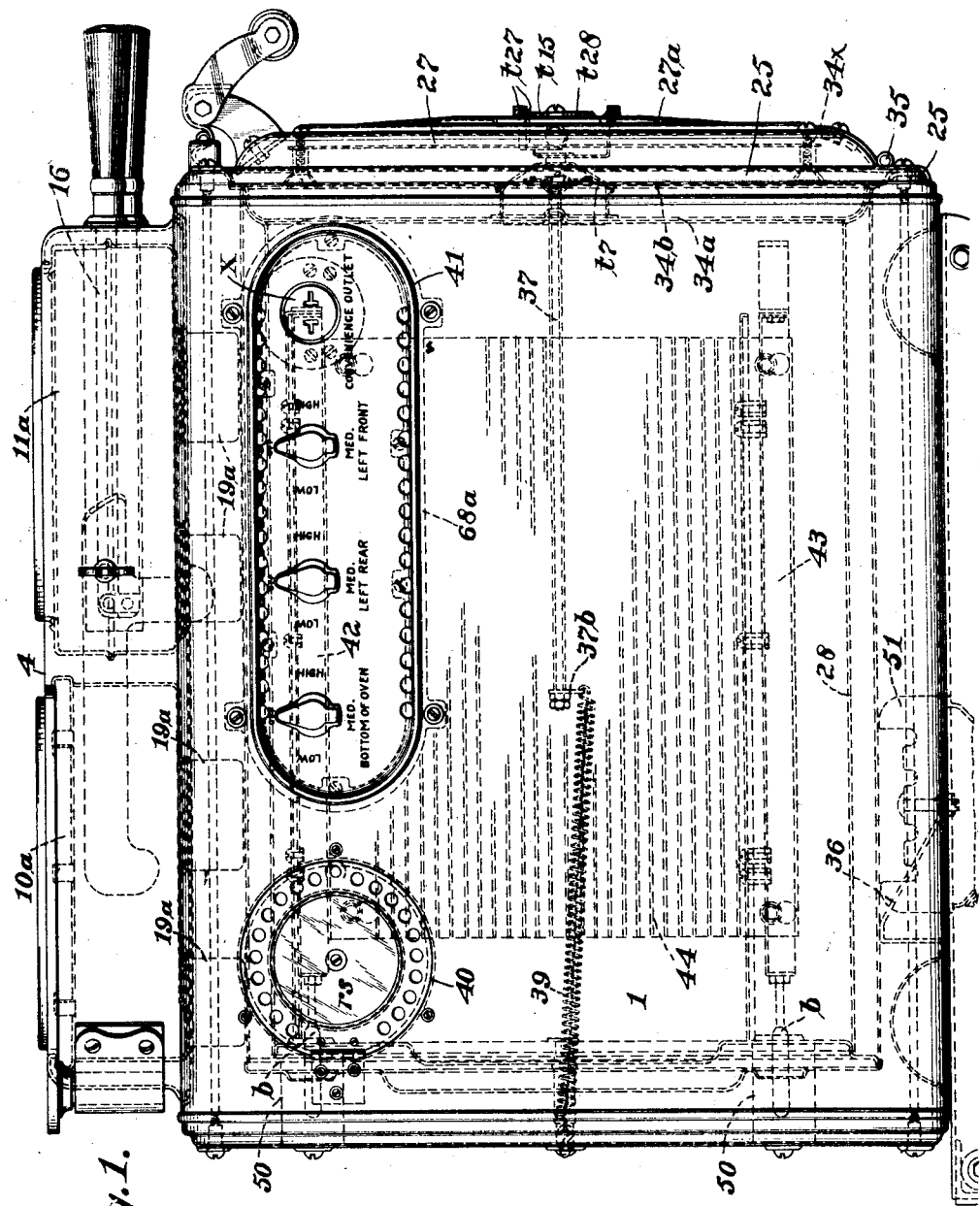

Original Filed Aug. 3, 1925　　7 Sheets-Sheet 2

Inventor:
Charles C. Armstrong,
by Spear, Middleton, Donaldson & Hall
Attys.

Aug. 13, 1929.  C. C. ARMSTRONG  1,724,164
ELECTRIC STOVE
Original Filed Aug. 3, 1925   7 Sheets-Sheet 3

Inventor:
Charles C. Armstrong,
by Spear Middleton Donaldson & Hall
Attys.

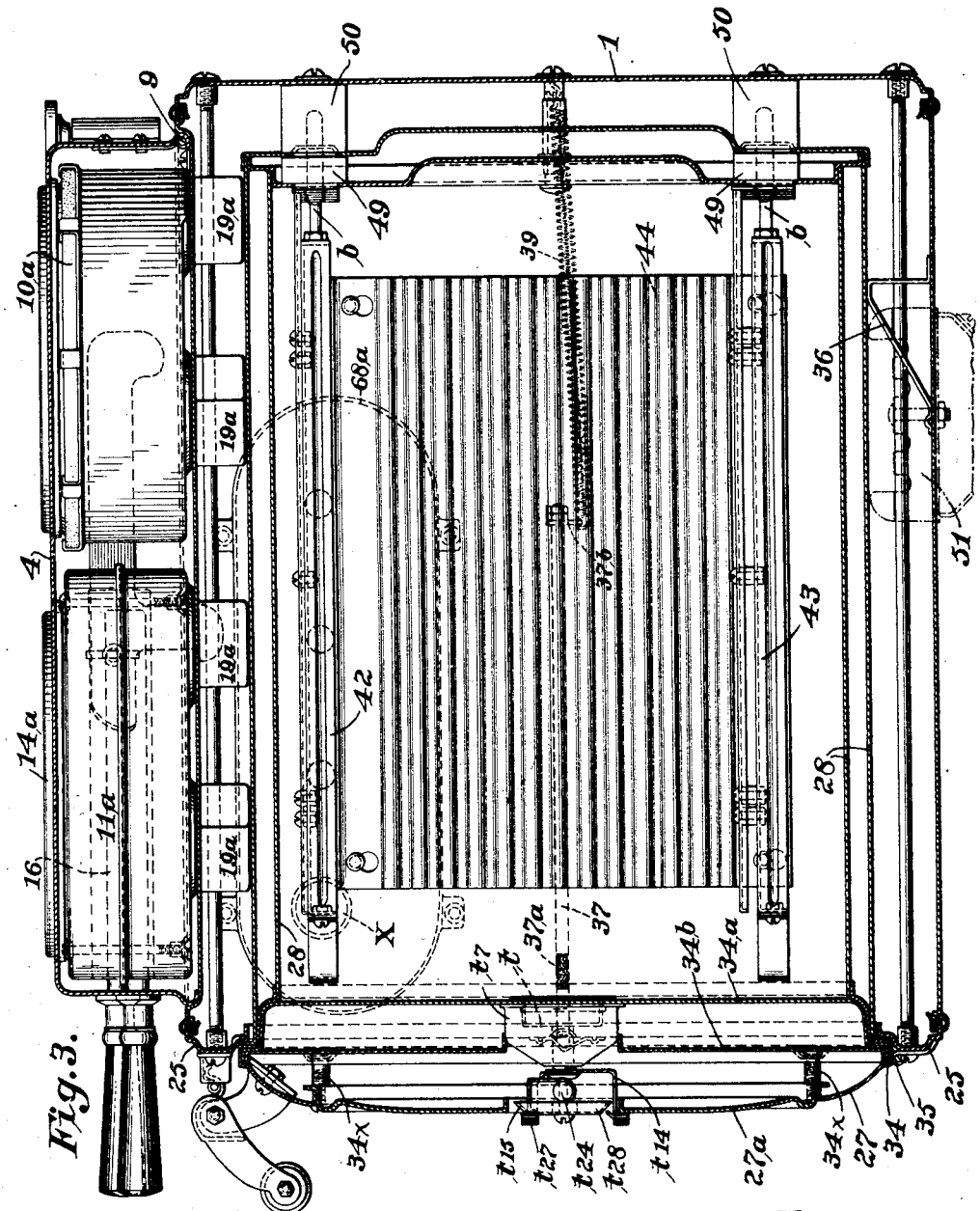

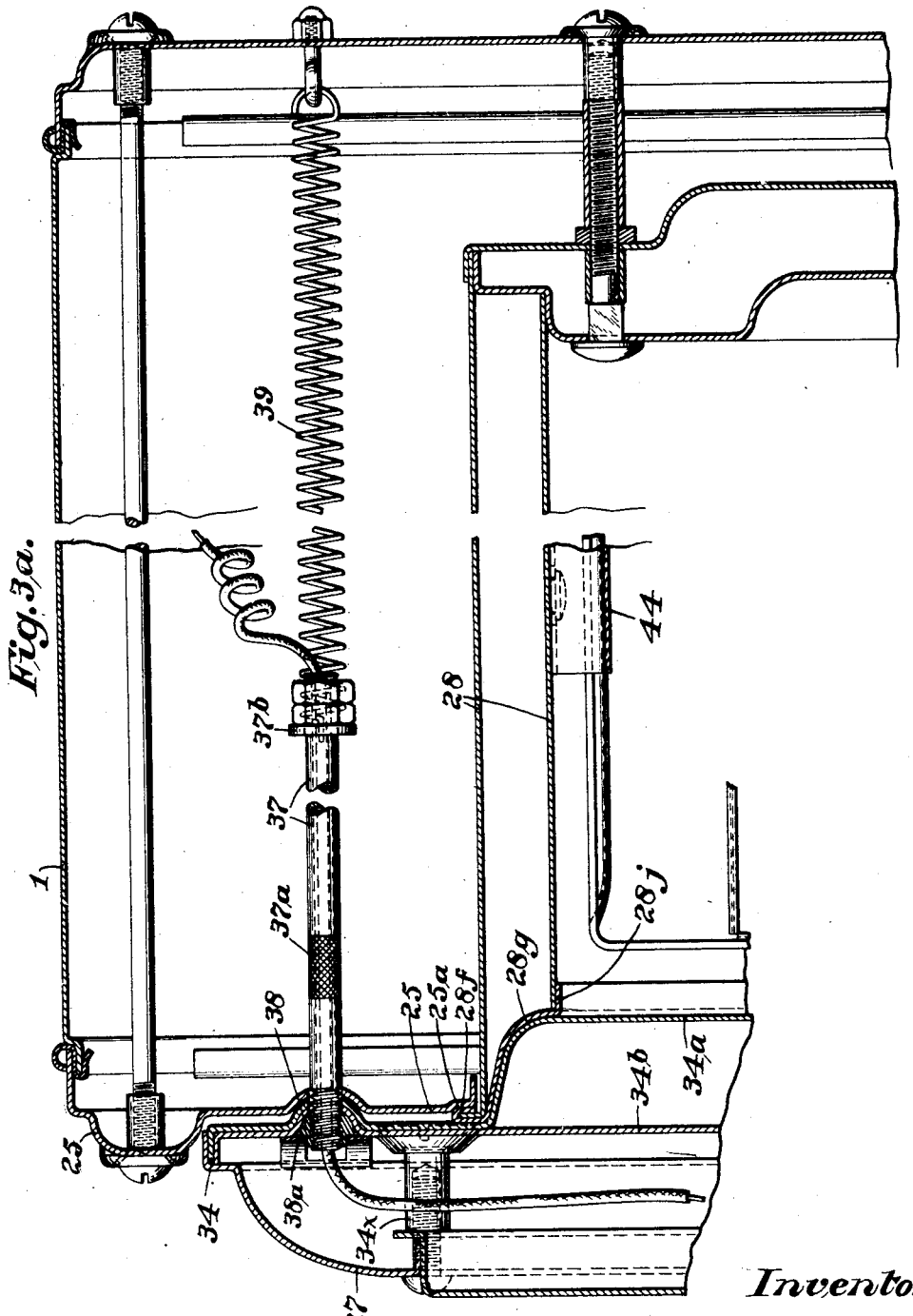

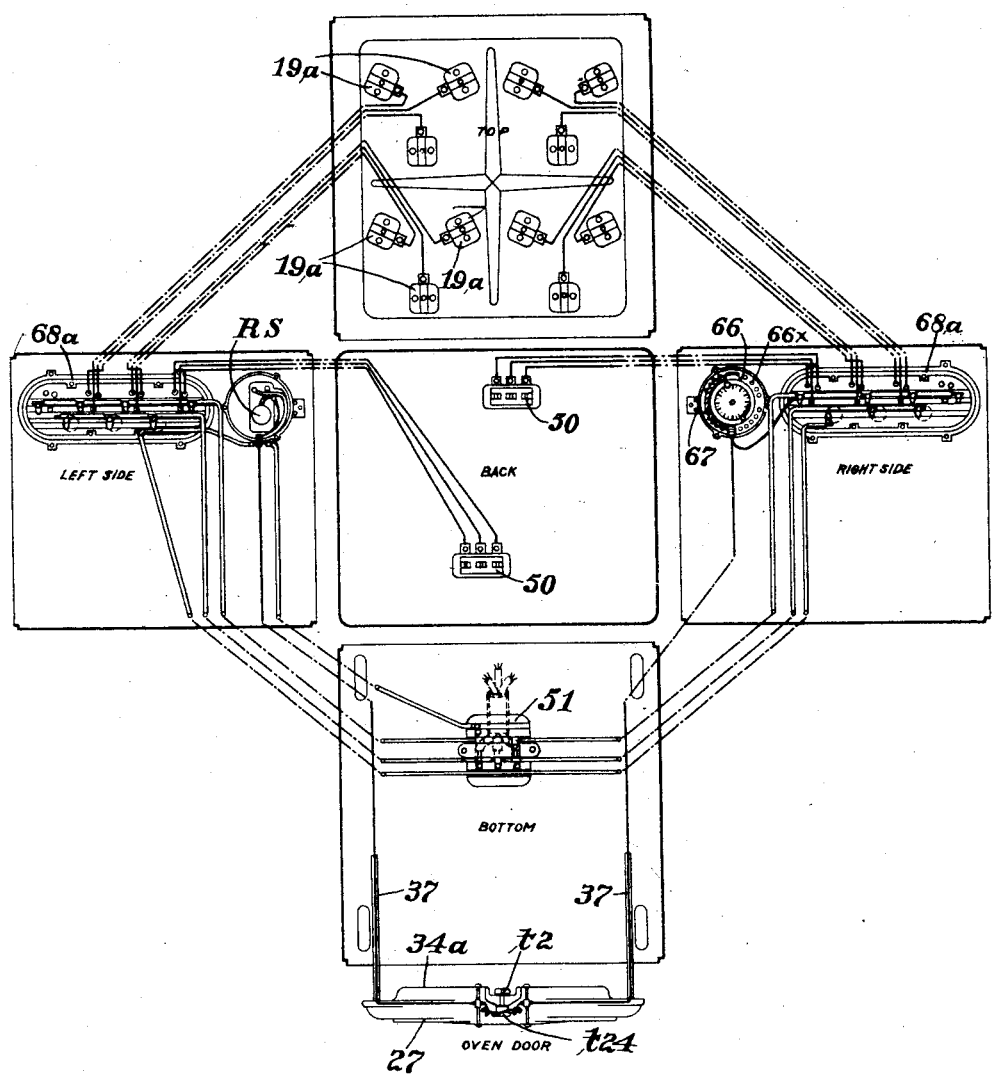

Aug. 13, 1929.  C. C. ARMSTRONG  1,724,164
ELECTRIC STOVE
Original Filed Aug. 3, 1925   7 Sheets-Sheet 7
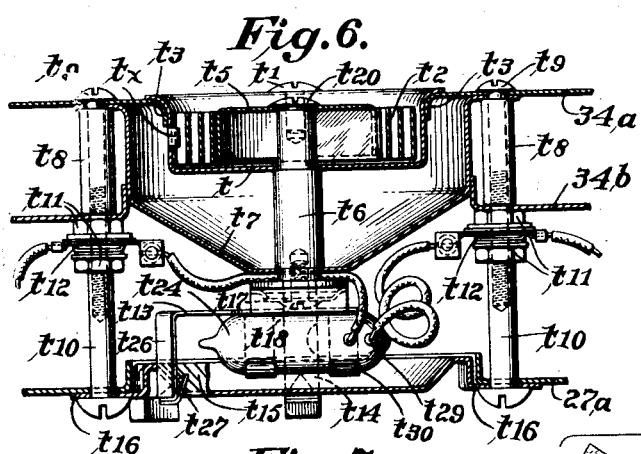
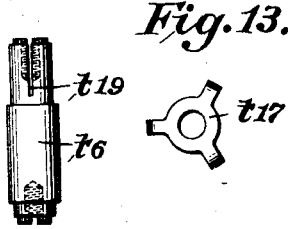
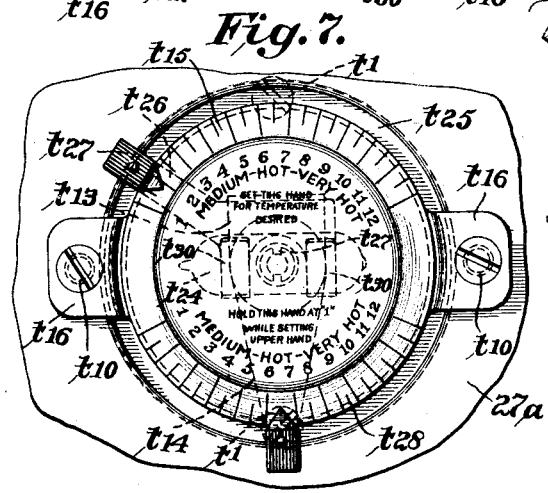
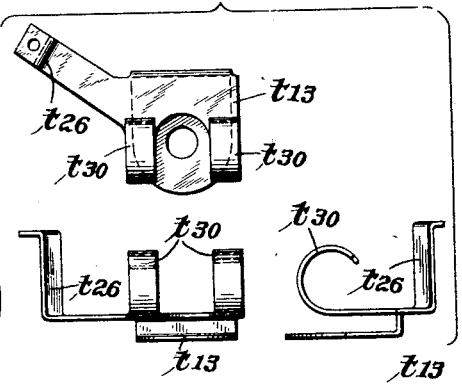
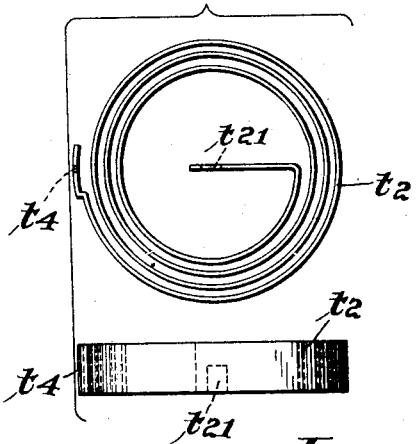
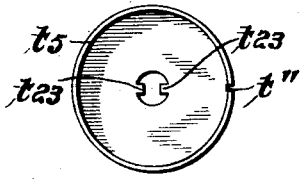
Inventor:
Charles C. Armstrong,
by Attys.

Patented Aug. 13, 1929.

1,724,164

UNITED STATES PATENT OFFICE.

CHARLES C. ARMSTRONG, OF HUNTINGTON, WEST VIRGINIA, ASSIGNOR TO THE ARMSTRONG ELECTRIC AND MANUFACTURING CORPORATION, A CORPORATION OF DELAWARE.

ELECTRIC STOVE.

Original application filed August 3, 1925, Serial No. 47,830. Divided and this application filed February 3, 1927. Serial No. 165,676.

This invention disclosed herein is a division of the subject matter disclosed in my application filed Aug. 3, 1925, Serial No. 47,830 and concerns the means of control of the electric stove. The stove comprises say four electric heating elements exposed at the top of the stove and an electric heating element in the oven, a relay switch in one side of the body, a time controlled switch at the other side of the body and a thermostatic switch in the door of the oven and the present invention relates to this organization of electric heating elements and their control.

The oven has full automatic control, that is to say, it will start up automatically at a time which may be set, by the cook or housekeeper, by the clock attachment on the stove, and it will regulate the temperature to the degree of heat desired to cook fast or slow as the cook desires, and it will shut off the current at the prescribed time to stop the cooking, this being done automatically and according to the setting of the control by the cook.

In the drawings:

Figure 1 is a side view of the stove embodying my invention.

Fig. 1ᵃ is a view of the opposite side of the stove.

Figure 1A:
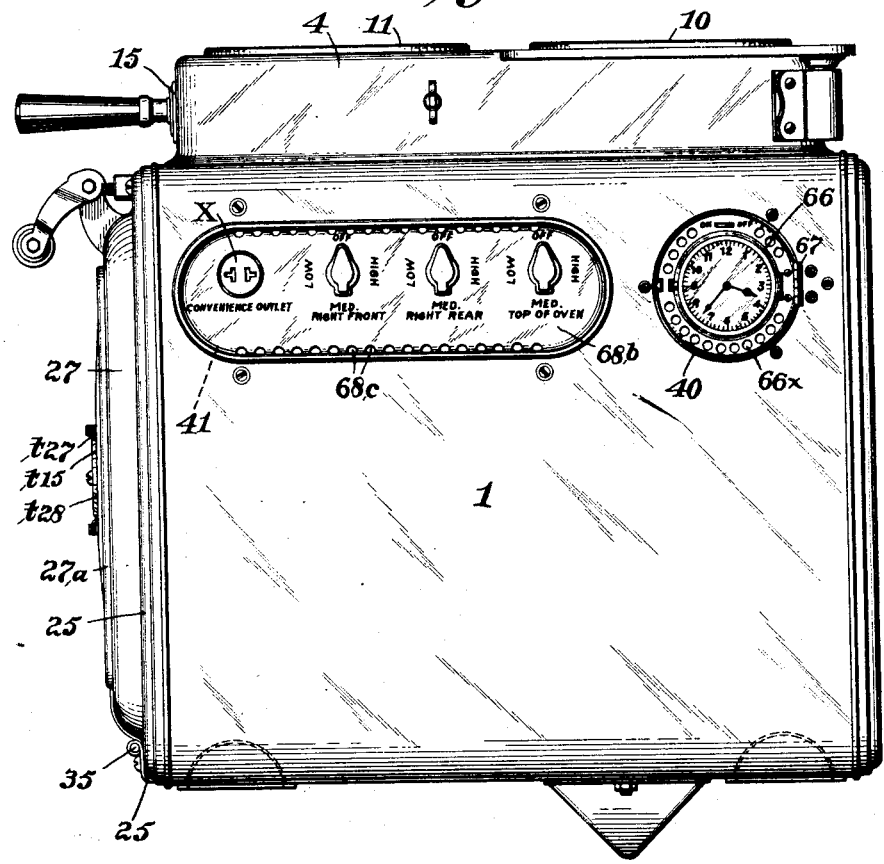
Figure 3B:
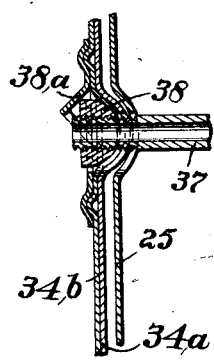
Fig. 3 is a vertical section of the stove from front to rear.
Figure 3C:

Fig. 3ᵃ is an enlarged view of part of Fig. 3.

Fig. 3ᵇ is a detail view.

Fig. 3ᶜ is a detail.

Fig. 4 is a diagram of the control system.

Figure 5:
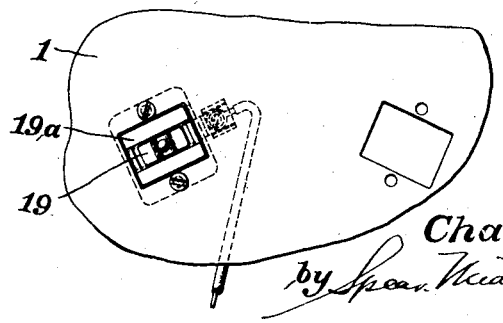

Fig. 5 is a detail view of electric contacts.

Fig. 6 is a horizontal sectional view of the thermostat organization.

Fig. 7 is a front view.

Figs. 8, 9, 10 and 11 are views of details.

Fig. 12 shows the thermostat spring.

Fig. 13 is a detail view of a spring friction washer.

In the drawings 1 indicates the stove body, having a cover section 4 hinged at its rear edge 9, so that it may be swung up to render accessible the top plate of the body, or the heating elements 10, 10ᵃ, 11, 11ᵃ supported thereon. These elements, when the cover is down, are exposed through openings in the cover member.

The front wall of the cover member is provided with openings for the insertion or removal of waffle irons and a toaster, into and away from the front pair of heating elements 11, 11ᵃ, the toaster being at the right and the waffle irons being at the left, as indicated at 15, 16 respectively.

The heating elements need not be disclosed in detail. Each has spring contacts at 18, which engage electric contacts mounted on the top plate of the main body 1 for which purpose spring members 19 are mounted in insulating blocks 19ᵃ, secured to the underside of the top plate of the body 1, which is provided with an opening through which the spring contact members 19 are exposed to receive the depending spring contacts of the heating elements.

Within the main body 1 the oven member 28 is supported in spaced relation to the top, bottom, back and sides thereof, for affording insulation against the escape of heat, and the oven is composed of inner and outer walls with a dead air space at the top, sides, back and bottom of the oven for heat insulation.

The oven is supported at its front end in the panel member 25 for which purpose said panel or front member is stamped to provide a seat at 25ᵃ of curved form to receive the rounded surface of the turned bead or edge 28ᶠ on the member 28ᵍ which forms the front end or portion of the oven proper. This bead is formed on a flange projecting from the said member 28ᵍ. This member 28ᵍ is secured to the walls of the oven by its bead 28ᶠ and by a weld at 28ʲ, and it is curved to provide a seat for the door. This door 27 is hinged at its lower edge to the front body panel 25 at 35 and it is composed of a front portion, a panel 27ᵃ, a back 34ᵃ curved to fit the curved seat at the front of the oven, and an intermediate member 34ᵇ. These members of the door are held together by their interlocking flanges at 34 and by male and female screws 34ˣ which connect the door members 27, 27ᵃ, 34ᵃ, and 34ᵇ, and make a rigid door structure. These screws are located near the corners of the door structure. The inner heads of these screws are countersunk in recesses formed in the plane or flange portions of the members 34ª, 34ᵇ, where these contact and make a double thickness of material. The part 28ˢ of the oven and the inner plate 34ª of the door are stamped out in the same die at the same time so that they will fit perfectly where they contact with each other.

A door of the construction described provides two dead air spaces, one on each side of the central plate or member 34ᵇ and these spaces provide heat insulation at these points.

By my construction the insulation of the oven against the loss of heat is carried out to a maximum degree. The features entering into this is the double wall construction of the oven itself, with a dead air space between its walls, also the dead air space between the oven and the wall of the body, and the further dead air space between the top of the body and the cover member 4, which with the dead air space over the top of the oven provides, together with the dead air space between the top walls of the oven itself, a triple dead air space against the loss of heat upwardly from the oven, and at the front the double dead air spaces of the door provide for heat insulation here. The oven is removable and can be drawn out or pushed into place as one body.

When pushed into the main body, it engages inclines on terminal block 51 or skids 36 which raise it to the proper level properly spaced from the bottom of the main body, and also properly positioned to receive hollow nut or thimble for holding the oven in place and effect alignment of insulator block 49 between rear ends of oven and blocks 50, carried by main body, said blocks 50 supporting contacts whereby current will be supplied to the heating coils with which oven is provided, as will be described. The front portion of the oven may be said to have a self adjusting action. The opening in the panel member 25 and seat 25ª, being slightly larger than the bead and outer sheet metal wall of oven.

The door when lowered to substantially a horizontal position to gain access to the oven is held in this position by side rods 37, which are pivotally connected to the door by semi-spherical members 38 fitting in recesses in the door frame, said rods having springs 39 connected to their inner ends and to the rear wall of the main body of the stove by which the door is under stress tending to balance or close it.

These rods and springs lie in the space between the sides of the oven and the sides of the main body.

The sockets in which the semispherical pivots 38 work are formed in the double thickness of metal provided by the contacting flanges of the members 34ª, 34ᵇ. There is a clip 38ª at each of the hemispherical front pivot bearings 38 of the rods 37 which clip engages the back or square shoulder on the hemispherical members. The lowered or horizontal position of the door is determined by the plate 37ᵇ on the rod 37 coming against the inner side of the front wall 25 and acting as a stop. This plate has the spring 39 connected thereto.

In order to take out the oven it is necessary to drop the front door down further than normal horizontal or lowered position, and for this purpose the rods which support the oven door in lowered position are provided with knurled portions 37ª by which the rods may be turned and disconnected from the nuts 38 and the door then can be lowered far enough to not obstruct the oven in its removal.

The right and left sides of the main body of the stove are symmetrical relative to each other in that each has a circular recess 40 near its rear upper corners, and along the upper margin of each side there is an elongated recess 41.

In the circular recess at one of the sides there is located a relay electric switch and at the other circular recess there is located a timing device or clock which will control the current supply automatically according to the time it is desired that the oven heating elements are to be put in operation and the time they are to be put out. The clock or timing mechanism may be placed in either of the recesses and the switch in the other and the stove is thus capable of being used as a right hand or as a left hand stove in the sense that the clock may be placed either at the right or left to suit the position that the stove must assume in relation to the room in which it is placed.

In other words the clock or timer and the relay switch are interchangeable in position.

Figure 2:
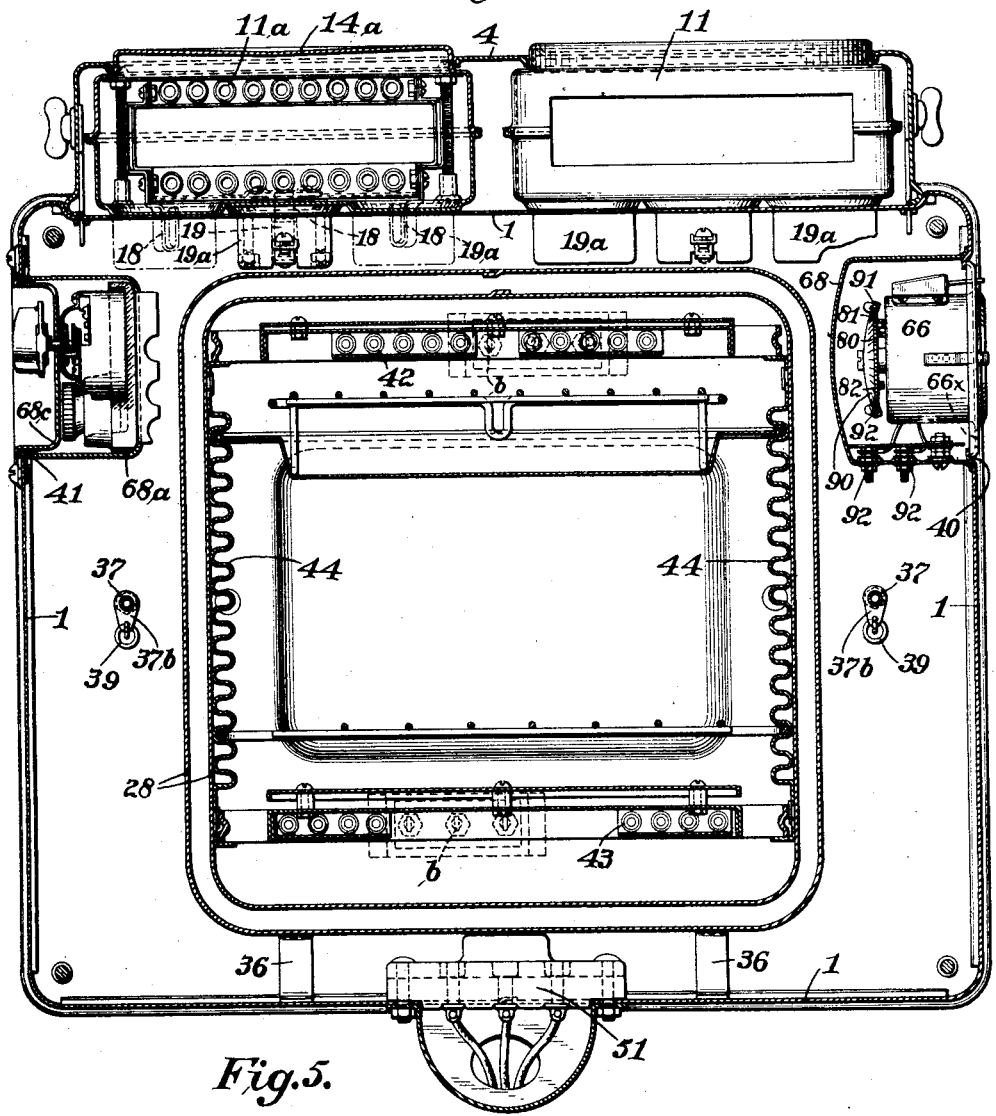
Fig. 2 is a vertical cross sectional view of the stove.

Referring to the cross sectional view Fig. 2:

The oven is provided with upper and lower heaters 42, 43. Also side racks 44 for receiving the cooking utensils at different heights.

The terminals of the oven heaters, one of which terminals is shown at b project rearwardly from the oven heating element through insulating blocks 49 where they engage spring terminals carried by the insulating blocks 50, fixed to the rear wall of the main body. These terminals move with the heating element when it is withdrawn from or replaced into the oven.

A main terminal block is shown at 51 to which the outside leads are connected and from which the connections of the stove installation lead.

This installation is shown diagrammatically in Fig. 4 which represents the back, top and right and left sides and bottom of the main body. The view of the back is of the inner side, that of the top is a bottom view, and the inner side of the right and left sides. The bottom is shown in plan. The door is also shown in this diagram in plan view.

The rear upper open burners 10 are composed of a coil in spiral form seated in a groove of an insulating clay block. These burners can supply three different heating effects. One heating effect is secured when only one portion of the coil is in operation, another i. e. a greater heating effect is received when two sections are connected in multiple, and when the two sections are in series a lower heating effect is obtained. When only one section is in use, it is the one at the center of the heater so that a small heating area is presented to heat a small vessel or to concentrate the heat at the center of a large vessel.

Each heating element at the top of the stove is provided with three of the depending contacts 18. In the diagram Fig. 4 the blocks 19$^a$ are shown in sets of three which have the sockets with spring contacts therein with which the contacts 18 of the burners engage, that is, there is a set of three of these socket blocks for each of the top burners. One of these socket blocks is shown in Fig. 5 in which the block is marked 19$^a$ and the spring contacts at 19. The burners or heating units i. e. the entire member 10, for instance have their depending contacts 18 and their companion blocks 19$^a$ positioned so as to permit only of the proper electrical engagement.

The heating element 11 at the right of the front portion of the stove top is adapted to toast at both sides of the material being toasted, at once, and it also heats the griddle 14$^a$ at the same time.

The current may be sent through the upper coil alone or through both the upper and lower coils in parallel to get a quick heat, or through these two coils in series to get a low heat.

The time of starting cooking in the oven can be determined by the clock as well as time of stopping the cooking. The heat is controlled by the gauge set in the front hinged door and the connections leading to and from this thermostat extend through the hollow rods 37 which support the door when lowered. This control part of the apparatus includes a thermostat and time control mechanism connected in the same circuit with the actuating magnet coil of a relay switch shown generally at RS. Closing of the control circuit which is connected to the main feed lines energizes the magnet coil, closing the relay switch and completing the circuit carrying the main current to the oven elements. This relay switch like the time control is mounted within a casing extending into the main body of the stove. This casing is closed by a hinged cover which is perforated so that the temperature within the casing will be like that of the room.

There is a space as above stated between the oven and the wall of the main body both at the top, sides, bottom and rear bottom portion of the oven, and all of the circuit wires are located in this space, where they are concealed from view, safeguarded from injury and easily accessible when the oven is removed.

*Thermostat.*

The thermostat for controlling the temperature of the oven is mounted in the hinged front door.

Openings are provided through the three plates or members of the front door to receive the thermostat mechanism. In the opening in the back sheet metal plate 34$^a$, Fig. 6, a cup shaped shell $t$ is mounted by the contacting flanges thereof engaging the flange $t^3$ of the door member, screws $t^1$ holding the shell in place. The open side of this cup member communicates with the oven space and consequently is exposed to the oven temperature. Within this cup shaped member is located the thermostat coil $t^2$, the outer end of this coil being attached to the wall of this cup shaped shell for which purpose the shell has an inwardly extending lug $t^x$ struck out therefrom which is engaged by the end of the coil, which is slotted at $t^4$ to receive the lug.

The inner end of the coil extends diametrically thereof and through a slot $t^{19}$ in the center shaft $t^6$ where it is held by a screw $t^{20}$ threaded into the shaft coaxially therewith and engaging a notch $t^{21}$ in the edge of the strip of metal forming the coil. The coil encircles a sheet metal cup shaped shell $t^5$ which is held to the shaft by the same screw $t^{20}$ which serves to hold the inner end of the coil to the center shaft. This shell is slotted at $t''$ for the passage of the coil. It is provided with projections $t^{23}$ which enter the slot $t^{19}$ of the shaft and hold it against circumferential displacement relative to the shaft. This shaft $t^6$ has a bearing in the shell $t$ and in a sheet metal shell $t^7$ which is flanged and is secured to the plate or member 34$^a$ of the front door by a spacer $t^8$ extending between the walls 34$^a$ and 34$^b$ of the door.

A screw $t^9$ extends through the spacer and is threaded into a screw $t^{10}$, the head of which bears on the outer side of the front wall or member of the door structure. Threaded on the screw $t^9$ are nuts $t^{11}$, one of which bears on the outer face of the intermediate plate 34$^b$ of the door. Between these nuts the insulated electric terminal $t^{12}$ of the thermostat is clamped. This construction $t^8$, $t^9$, etc. is duplicated at the other side of the thermostat organization. The shell $t^7$ closes the flanged opening in the intermediate member or plate $34^b$ of the door structure and there is a dead air space between this shell and the cup $t$ in which latter the thermostat coil is located so that thermal insulation is secured at this point insuring that the thermostat coil will be subjected only to the temperature within the oven. The shaft $t^6$ is shouldered at its outer end and on the reduced end thus provided is mounted a holder $t^{13}$ for the mercury tube $t^{24}$ which has within it the electric contacts which are closed and opened by the mercury according to whether the position of the tube is such as to immerse the contacts or to flow the mercury away therefrom.

This mercury tube holder is mounted frictionally on the shaft by a screw $t^{18}$ and spring washer $t^{17}$ so that the holder can be turned about the shaft for adjustment and at the same time the holder will remain frictionally attached in any position to which it may be set so as to partake of the movement of the shaft due to the expansion or contraction of the coil, it being understood that as the coil has it outer end fixed to the stationary shell $t$ at $t^x$ expansion or contraction of the coil under variations in temperature of the oven will cause the inner end the coil to rotate the shaft $t^6$ in one direction or the other according as the temperature rises or falls. The tube holder has an arm $t^{26}$ with a pointer $t^{27}$ thereon to move over a scale $t^{15}$. This scale is marked on a stamped sheet metal shell provided with ears $t^{16}$ overlying and screwed to the outer surface of the front wall of the door.

There is a space or slot between the edge of the scale member and the edge of the door plate as shown at $t^{25}$ and the arm $t^{26}$ extends out through this slot or space, where it is accessible for setting by the cook.

Fixed to the shaft $t^6$ there is an indicator arm $t^{14}$. This has an opening to fit the reduced end of the shaft with projections $t^{27}$ to fit a curf in this reduced shaft end wherein the projections are held because the hub portion of this arm underlies the hub portion of the tube holder which as above stated is frictionally held by the spring washer and screw.

This indicator arm works over a scale $t^{28}$ marked on the same plate with the scale $t^{15}$, but in the opposite direction.

The contact points carried within the mercury tube are shown at $t^{29}$ and electrical connection is made to these points from the terminals $t^{12}$ above described.

In setting the thermostat for any desired temperature the indicator pointer is held or moved to the scale mark 1 on its scale $t^{28}$ and while it is held in this position the pointer $t^{27}$ of the mercury tube holder is moved on its scale $t^{15}$ to the point or scale mark indicating the temperature desired. This latter action of course will set the holder in relation to the shaft $t^6$ and the indicator pointer. Then release the indicator pointer and allow the instrument to assume its position according as the temperature of the coil will call for at this moment. Now when the indicator hand under a rise in temperature reaches the mark on its scale corresponding to the mark at which the pointer of the mercury tube holder was initially set in making the setting or adjustment, the mercury tube will have reached a position at which it will be so inclined that the mercury will flow away from the contact points leaving them bare and thus the current to the actuating coil of the relay switch will be broken and the current to the heating elements will be cut off and remain so until the temperature within the oven falls below that for which the instrument is set, whereupon the contraction of the coil will turn the shaft $t^6$ the other way and by carrying the mercury tube holder along with it the latter will be inclined the other way so that the mercury will flow to the end of the tube at which the electrical contacts are located, causing their immersion and electrical connection and the current will therefore be supplied again to the heating elements.

The various shells above described, the tube holder, the indicator arm, the spring washer, and the terminals $t^{12}$ are all of stamped sheet metal. The tube holder has besides its arm $t^6$ and the hub portion, a pair of arms $t^{30}$ which have sufficient spring action to grip the tube and hold it in place.

The general construction of the thermostat organization lends itself to association with the construction of the door above described, and the feature relating to heat insulation is carried out in connection with this thermostat organization.

At 66 is indicated generally the time control switch by which the operator can set the electric heating system for the oven to begin its heating effect at a certain time, and to cut off the electric current to the oven heating elements at a predetermined time.

This switch or time control mechanism includes a clock of standard form within the casing 66 which is hinged at 67 to be moved into and out of one of the recesses in the main body of the stove. This recess is formed by the casing 68, Fig. 2, attached to the stove body and projecting into the interior thereof in the space between one of the side walls and the oven.

The flange of casing 66 is perforated at $66^x$ to keep the temperature within the casing 68 at or near the room temperature.

The control of the circuit which operates the oven heaters is exerted by a tipping mercury tube within the casing 66 substantially like that described above in connection with the thermostatic control means. This tipping tube is operated by studs 81 and 82 engaging a stud 80 connected with the holder of the mercury tube. The studs 81, 82 are connected with pointers 91, 92 which may be set at different points about the dial 90 which rotates with the hour hand carrying the pointers 91, 92 and the studs 81, 82 around with it to operate the tipping mercury tube at the predetermined times according to the setting of the pointers so that the stud 81 which causes the closing of the circuit and the stud 82 which causes the breaking of the circuit, by tipping the tube, will be brought to the stud 80 to move the same for tipping the mercury tube either one way or the other. As the specific form of the time controlled switch does not form a part of the subject matter of the present divisional application it is not necessary to describe the same in further detail.

The feature of the heat insulation is carried out in connection with the time control mechanism for which purpose the inner casing or shell 68 is provided attached to the side of the main body.

Within this casing are located binding posts 92 for the electrical connections.

The switches at the sides of the body which control the heating elements for "low", "medium" or "high" heat or "off" condition are arranged in a casing or shell 68$^a$. This is formed of stamped metal and it is secured by screws to the body of the stove. The switches are arranged on insulating blocks and these blocks are located within said casing, but extending through the bottom thereof in respect to the interior space of the stove. Fuses are located in this casing, and a convenience outlet X is also employed.

The front of this receptacle is closed by a plate 68$^b$ having ventilating openings 68$^c$ for the purpose of keeping the temperature inside the casing 68$^a$ as nearly at room temperature as is possible.

I claim:

1. In combination in an electric stove, a main body, a door hinged thereto, a hollow rod slidably mounted in the body, and pivotally attached to the door for holding it in substantially horizontal position when lowered, said hollow rod having within it an electric circuit wire connecting a thermostat on the door with an electric heating element on the stove body, substantially as described.

2. In combination in an electric stove an oven door composed of an inner, an outer, and an intermediate plate spaced apart and having aligning openings, a cup-shaped shell in the opening in the inner plate having its open side communicating with the oven space, a cup-shaped shell enclosing the first mentioned shell and seated in the opening of the intermediate plate and with its side walls secured to the inner plate, a scale plate fixed in the opening of the outer plate of the door, said cup-shaped shells having a dead air space between them, and the plates of the door having dead air spaces between them, said shells affording bearings for a shaft and the inner shell affording a casing for a thermostatic coil attached thereto, and to said shaft, the space between the second mentioned shell and the scale plate affording a receptacle for a circuit closing device, and indicating means to cooperate with the scale plate, substantially as described.

3. In combination with the stove body and its oven, a door for the oven composed of an outer, an inner, and an intermediate plate spaced apart, said plates having aligning openings, a member closing the opening of the inner plate, an intermediate member closing the opening in the intermediate plate and flanged to bear on the inner plate, and also closing the dead air space of the inner and intermediate plates, said members enclosing a dead air space between them, and having bearings for a shaft of a thermostat make and break device, a scale plate in the opening of the outer door plate, bolts passing through the plates of the door and holding the scale plate and the intermediate member in place, substantially as described.

4. In combination in an electric stove, a body having an oven therein, a door for the oven composed of an inner, an outer and an intermediate plate, having aligning openings, a member closing the opening in the inner plate, an intermediate member closing the opening in the intermediate plate, said members having bearings for a shaft of a thermostatic device, a scale plate in the opening of the outer plate, bolts extending through the plates and holding the scale plate and intermediate member in place, circuit closing means operated by the shaft, and terminals on the bolts electrically connected to the circuit closing means, substantially as described.

5. An electric stove having automatic heat and time control including a thermostat and a time piece controlled circuit maker and breaker in circuit with the electric heating means, and an electric relay, the said time piece being located in an opening in one of the lateral side walls of the stove and the relay being located in an opening in the other lateral side wall of the stove, said time piece and relay being interchangeable and each fitting in either of said openings, whereby the stove is rendered right or left hand, substantially as described.

6. An electric stove having automatic heat and time control and electric switches, one of said switches being located in an opening in one lateral side of the stove and the time piece being located in an opening in the other lateral side of the stove, said openings being of similar form and said time piece and switch being interchangeable, each lateral side of the stove having another recess with electric switches therein for controlling the heating elements, substantially as described.

7. In combination in an electric stove, a body, an oven located therein with a dead air space between it and the wall of said body, an electric heater within the oven, heating elements at the top of the stove, circuit connections, switches located at the opposite sides of the stove at openings in the wall thereof, clock works located in an opening in the stove side, and controlling a circuit maker and breaker, for controlling the oven heater, a relay located in an opening in the other stove side, and casings secured to the wall of the stove and protecting the switches, relay, and clock works, with the circuit maker and breaker from the heat of the oven, substantially as described.

8. In combination in an electric stove, a body, an oven therein with a dead air space between it and the wall of said body, electric heating means within the oven, electric heating elements at the top of the stove, clock works located at an opening in the stove wall, a relay switch also located at an opening, said clock works and relay switch controlling the circuit to the oven heating element, and switches controlling the electric heating at the top of the stove located at an opening in the stove wall, casings extending into the dead air space of the stove body partly enclosing said clock works, relay switch and hand switches, and covers for the said casings having openings for keeping the temperature within said casings at or near room temperature, substantially as described.

9. In combination in an electric stove, a body, an oven located therein with a dead air space between it and the wall of the body, an electric heater within the oven, a circuit controlling device located in the side of the stove body and a casing secured to the wall of the stove body, projecting into the dead air space between said body and oven and shielding said circuit controlling device from the heat of the oven, substantially as described.

10. An electric stove according to claim 9 having a cover for the protecting casing, said cover having openings for keeping the temperature within the casing substantially at room temperature, substantially as described.

11. In combination in an electric stove, a hinged door for the oven having an inner, an outer, and an intermediate plate spaced apart, to provide heat insulation, said parts having aligning openings, and members closing the openings in the inner and intermediate plates, and having a dead air space between them, said members furnishing bearings for a shaft of a thermostat and a member in the opening of the outer plate serving as a dial for said thermostat, substantially as described.

In testimony whereof, I affix my signature.

CHARLES C. ARMSTRONG.